United States Patent [19]

Adam et al.

[11] Patent Number: 4,524,181

[45] Date of Patent: Jun. 18, 1985

[54] CURABLE EPOXY COMPOSITIONS AND CURED RESINS OBTAINED THEREFROM

[75] Inventors: Randall E. Adam, Woodbury; William J. Schultz, Vadnais Heights, both of Minn.

[73] Assignee: Minnesota Mining and Manufacturing Company, St. Paul, Minn.

[21] Appl. No.: 522,420

[22] Filed: Aug. 11, 1983

[51] Int. Cl.$^3$ .............................................. C08L 63/02
[52] U.S. Cl. .................... 525/107; 524/400; 524/427; 524/428; 524/500; 525/108; 525/218; 525/454; 525/455; 525/452; 525/524; 525/528; 525/529
[58] Field of Search ............... 525/528, 529, 531, 108, 525/107, 454, 455, 524; 524/400, 500, 427, 428

[56] References Cited

U.S. PATENT DOCUMENTS

| | | | |
|---|---|---|---|
| 2,604,464 | 7/1952 | Segall et al. | 260/80.5 |
| 2,662,870 | 12/1953 | Allenby | 260/45.5 |
| 3,065,195 | 11/1962 | Vasta | 260/41 |
| 3,247,288 | 4/1966 | Masters et al. | 260/837 |
| 3,310,603 | 3/1967 | Kelly | 260/837 |
| 3,316,195 | 4/1967 | Grosner et al. | 260/29.6 |
| 3,378,601 | 4/1968 | Tanaka et al. | 260/831 |
| 3,496,250 | 2/1970 | Czerwinski | 260/836 |
| 3,707,516 | 12/1972 | Walus | 260/21 |
| 3,816,557 | 6/1974 | Swanson et al. | 260/837 |
| 3,819,567 | 6/1974 | Swanson et al. | 260/42.28 |
| 3,833,683 | 9/1974 | Dickie et al. | 260/836 |
| 3,856,883 | 12/1974 | Dickie et al. | 260/836 |
| 3,864,426 | 2/1975 | Salensky | 260/837 |
| 3,894,112 | 7/1975 | Pagel | 260/830 |
| 3,943,187 | 3/1976 | Wu | 260/837 |
| 4,107,116 | 8/1978 | Riew et al. | 260/23 |

*Primary Examiner*—Theodore E. Pertilla
*Attorney, Agent, or Firm*—Donald M. Sell; James A. Smith; Lorraine R. Sherman

[57] ABSTRACT

Cured epoxy resins having reduced susceptibility to mechanical and thermal shock are prepared from a composition comprising a curable epoxide compound and elastomeric particles colloidally dispersed therein, the particles having been prepared by in situ polymerization in the epoxide compound in the presence of a stabilizer.

15 Claims, No Drawings

CURABLE EPOXY COMPOSITIONS AND CURED RESINS OBTAINED THEREFROM

DESCRIPTION

Field of the Invention

This invention relates to a curable epoxy composition containing dispersed elastomeric particles, the composition being storage-stable against separation of phases. In another aspect, it relates to the cured epoxy resin derived therefrom. In a further aspect, methods for providing the elastomeric particle-containing curable epoxy composition and cured resin are disclosed. The cured epoxy resin is useful, for example, as an adhesive, coating or molding compound having reduced susceptibility to mechanical and thermal shock.

Background Art

Epoxy resins, i.e., organic compounds having one or more terminal or pendent oxirane groups,

have been widely used for many years in compositions for making molded, cast, and potted products, and for coatings and adhesives because of the relative ease with which they can be converted to cured solid products that are strong and resistant to many chemical environments. Many cured epoxy resins having a high glass transition temperature are known to be brittle and tend to be susceptible to mechanical and thermal shock. To overcome this deficiency, plasticizers and flexibilizers have been introduced into the epoxy composition. U.S. Pat. No. 2,604,464, U.S. Pat. No. 2,662,870, U.S. Pat. No. 3,065,195, and U.S. Pat. No. 3,310,603 teach the addition of a polymer of various ethylenically-unsaturated monomers to form a solution of the polymer in the epoxy resin that on curing gives resin that has reduced glass transition temperature and modulus and therefore is flexibilized. U.S. Pat. No. 3,247,288, U.S. Pat. No. 3,378,601, and U.S. Pat. No. 3,943,187 teach the preparation of an epoxy resin solution that yields flexibilized products on curing that is made by the polymerization in a curable epoxy resin of various ethylenically-unsaturated monomers that give a polymer soluble in the uncured epoxy resin and in the cured epoxy resin. Coating compositions which are solutions of a graft polymer having a backbone segment of α,β-unsaturated monocarboxylic acid units and side chain segments of epoxy polyether dissolved in an organic solvent, as in U.S. Pat. No. 3,707,516, or in an epoxy resin as in U.S. Pat. Nos. 3,816,557 and 3,819,567, are also known. The above-described techniques for overcoming the susceptibility of the cured epoxy resins to mechanical and thermal shock have not been entirely satisfactory. The dissolved polymers cure to form a homogeneous copolymer with the epoxy resin and drastically effect desirable epoxy properties such as resistance to heat distortion, glass transition temperature and modulus of elasticity.

The incorporation of insoluble modifiers into epoxy resins to reduce their susceptibility to shock is also known. Thus, U.S. Pat. No. 3,316,195 teaches the incorporation of a modifier component that can be a latex of dispersed natural or synthetic rubber into an epoxy resin to provide an aqueous coating composition from which coatings having enhanced flexibility and reduced brittleness are obtained. U.S. Pat. No. 3,496,250 teaches the blending of an acrylonitrile butadiene-styrene graft polymer into epoxy resin to provide flexibility, shear strength, and impact characteristics to cured epoxy resin. These modified epoxy resins provide only moderate improvements in thermal/mechanical shock properties.

The brittle characteristics of epoxy resins has also been modified by the incorporation of an immiscible rubbery phase into the epoxy resin. U.S. Pat. Nos. 3,833,683, 3,856,883, and 3,864,426 teach the incorporation of a graded rubber or core shell rubber particle into an epoxy resin followed by curing. The graded rubber particles are prepared by the emulsion polymerization of a crosslinked rubbery polymer followed by the addition of 25 to 50 percent of a high glass temperature, generally crosslinked, acrylate polymer. The glassy acrylate forms a protective shell around the rubbery core. The shell allows the drying or coagulation of these particles without coalescence. The resulting particles are then mechanically dispersed in epoxy resins. The shortcoming of this method is the unstable nature of the dispersed colloid in the resin. The dispersions are in a quasi-stable state where the coagulation and precipitation of the particle is retarded only by the high viscosity of the medium. An additional disadvantage is the relatively large mass of glassy shell material that is incorporated into the colloidal particle. This portion has little effect on the brittle characteristic of the epoxy resin but tends to build viscosities to unacceptable levels. Epoxy compositions modified with core-shell particles frequently provide only moderate improvements in the brittle characteristics of epoxy resins.

An alternative method of improving the mechanical and thermal shock characteristics of epoxy resins can be achieved by dissolving reactive elastomers in the epoxy resin which phase-separate during curing. The technique is exemplified by U.S. Pat. Nos. 4,107,116 and 3,894,112. In this technique the structure and form of the dispersed rubber phase in the cured article are controlled by the cure rate, type of curative, and cure temperature. The technique may work well for some cure systems but can be ineffective for others. Another disadvantage is that there is generally some plasticization of the epoxy by the incompletely phase-separated elastomer thus resulting in reduction in the heat deformation temperature.

SUMMARY OF THE INVENTION

Briefly, the present invention provides an epoxy resin composition comprising a curable epoxide group-containing compound, and colloidally-dispersed therein, in situ polymerized elastomeric particles insoluble in the epoxide group-containing compound, the particles being stabilized against separation of phases by a stabilizing compound attached thereto.

The method of forming the epoxy resin composition of the invention is shown schematically in the flow chart below.

| FLOW CHART |
|---|
| Elastomer forming monomers (X) + Uncured epoxide |

FLOW CHART -continued

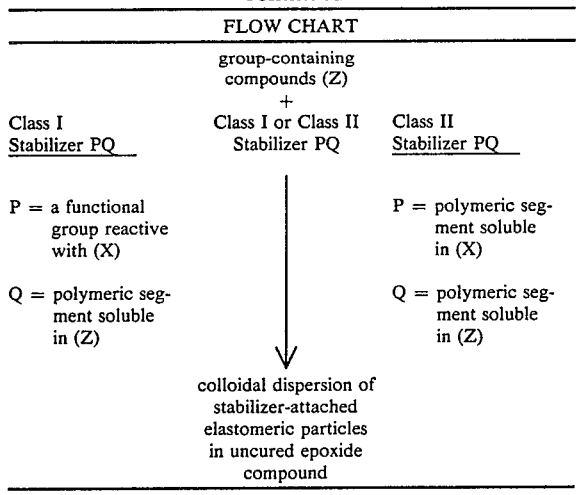

| Class I Stabilizer PQ | group-containing compounds (Z) + Class I or Class II Stabilizer PQ | Class II Stabilizer PQ |
|---|---|---|
| P = a functional group reactive with (X) | | P = polymeric segment soluble in (X) |
| Q = polymeric segment soluble in (Z) | | Q = polymeric segment soluble in (Z) |
| | ↓ colloidal dispersion of stabilizer-attached elastomeric particles in uncured epoxide compound | |

The invention is based on the discovery that compositions of elastomeric particles dispersed in epoxide group-containing compounds containing resins that cure to resins having reduced susceptibility to mechanical and thermal shock are stabilized against separation of phases by the use of a stabilizer having a segment soluble in the epoxy resin and a portion either soluble in the elastomeric particle or reactive into the elastomeric particle. Preferably, the insoluble, colloidally-dispersed, elastomeric particle in the composition of the invention comprises an elastomeric particle selected from particulate polymers of ethylenically-unsaturated monomers and polyurethanes that are insoluble in the curable epoxide compound and have a glass transition temperature of 25° C. or less. Most preferably, the colloidally-dispersed elastomeric particle comprises a copolymer of ethylenically-unsaturated monomers of which 75 to 98 percent by weight are selected from one or more ethylenically-unsaturated monomers whose polymer or copolymer is insoluble in the epoxide group-containing compound and 25 to 2 percent by weight of a stabilizer that is a copolymerizable ethylenically-unsaturated group-substituted polymer that has a molecular weight of at least 1000 and is soluble in the epoxide group-containing compound.

As used in this application:

"stabilizer-attached" means one end of the stabilizer compound has become attached, by means of absorptive, ionic, or covalent bonding, to the elastomeric polymer as it formed from the monomer composition, resulting in the elastomeric polymer forming a colloidal dispersion in the uncured epoxide compound and/or the cured epoxy resin;

"epoxide group-containing compound" means fluid organic compounds containing an oxirane group, i.e.,

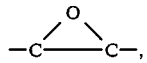

that can be cured by use of a curing agent or a catalyst to a "cured epoxy resin". In the trade "epoxy resin" is a term that has been used somtimes to mean the uncured oxirane group-containing compounds and sometimes the cured oxirane group-containing products. Herein, the term epoxide group-containing compounds means an organic compound containing one or more epoxide or oxirane groups and includes the uncured fluid epoxy resins of the trade;

"steric or entropic stabilization" means a solventless composition of colloidally-dispersed particles in which there is a lack of coalescence, i.e., the stabilizer-attached elastomeric particles have greater attraction for the epoxy resin than for other stabilizer-attached elastomeric particles;

"colloidally-dispersed elastomeric particle" means particles of less than 10 micrometer, preferably 0.05 to 1.0 micrometer, of organic polymer, having a glass transition temperature, $T_g$, of less than 25° C. which are distributed uniformly in a dispersion medium, namely, in an epoxide group-containing compound;

"monomer composition" means a composition of a mixture of components at least one of which is polymerizable or crosslinkable to an elastomer having a $T_g$ below 25° C.; and "abstractable or transferable proton" means a hydrogen that is removable from a first polymer, which hydrogen then terminates a growing second polymer chain, leaving a reactive site (e.g., a free radical site) on the first polymer where further polymerization can take place to form a graft (see subclass Ic Stabilizer).

DETAILED DESCRIPTION OF THE INVENTION

The present invention provides a solventless, fluid epoxy resin composition that is storage-stable against separation of phases for at least one year, and preferably for two years, is suitable for the preparation of cured epoxy resin having reduced susceptibility to mechanical and thermal shock, and is comprised of
  a. 1.0 part of curable epoxide group-containing compound, and
  b. 0.05 to 1.0 part of colloidally-dispersed elastomeric particles that are insoluble in the epoxide compound, comprising,
    (1) 75 to 98 percent by weight of an elastomeric polymer of one or more monomers in situ polymerized in the curable epoxide group-containing compound to a polymer which is insoluble in the epoxide compound, and
    (2) 25 to 2 percent by weight of a stabilizer having the formula PQ, in which
      Q is a polymeric segment that has a molecular weight of at least 1000 and is soluble in the epoxide group-containing compound, and
      P is
        (a) a functional group covalently attached to Q and also becomes attached to the elastomeric particle during particle growth by formation of a covalent or ionic bond with the elastomeric particle, or
        (b) a polymeric segment that has a molecular weight of at least 1000 and that becomes absorbed into the elastomeric particle because it is soluble in the elastomeric polymer of the monomer composition but insoluble in the epoxide group-containing compound.

In another aspect, the invention provides a process for the preparation of a solventless, fluid, epoxide compound-containing composition comprising the steps of:
  a. providing a curable epoxide group-containing compound,
  b. dissolving in the epoxide compound, in either order, from 0.05 to 1 part per part of epoxide compound of a composition comprising (1) 75 to 98 percent by weight of polymerizable monomer composition that is polymerizable to an elastomeric polymer insoluble in the epoxide compound and (2) 25 to 2 percent by weight of a stabilizer PQ as defined above, and c. subjecting the solution of the monomer composition in the epoxide compound to conditions which result in polymerization of the monomer composition and attachment of the stabilizer to the growing elastomer particle, without the monomer or stabilizer polymerizing or reacting with the epoxide group-containing compound.

The invention provides a process for producing stable colloidal dispersions of polymer particles, generally rubbery particles, in epoxide group-containing compounds using stabilizers therefor. In the process, a monomer, as defined below, that is soluble or dispersible in an epoxide compound, but whose polymer is insoluble in the epoxide compound, is polymerized in the presence of an entropic stabilizing compound that attaches itself to the surface of the growing colloidal particle, that results when the monomer polymerizes, and prevents flocculation, agglutination and precipitation of the particle. The stabilizing compound can be a compound having one part that is soluble in the epoxide group-containing compound and another part that is reactive with or copolymerizable with the monomer, forming a covalent or ionic bond for attachment to the growing colloidal particle. Alternatively, the stabilizing compound can be a compound having one part that is soluble in the epoxide compound and another part that is soluble in the growing colloidal particle and thus becomes attached by absorptive forces to the colloidal particle. Thus, the stabilizer disperses the colloidal particles into the epoxide group-containing compound preventing the colloidal particles from coalescing. The epoxide group-containing compound with steric or entropic stabilized dispersed colloidal particles therein does not phase-separate for at least one year, and preferably for up to two years.

Curable epoxide group-containing compounds (Z) which can be used in the composition of the invention are compounds that possess an oxirane group and have a glass transition temperature, Tg, below about 50° C. Included are monomeric and polymeric type compounds that can be branched or straight chain aliphatic, cycloaliphatic, aromatic, or heterocyclic (having O and/or N hetero atoms) and will typically have an epoxy equivalency of from 1 to 6, preferably 1 to 3. Particularly useful are the aliphatic, cycloaliphatic, and glycidyl ether type 1,2-epoxides such as propylene oxide, styrene oxide, vinylcyclohexene dioxide, glycidol, butadiene oxide, glycidyl propionate, diglycidyl ether or bisphenol A, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, bis(3,4-epoxy-6-methylcyclohexylmethyl)adipate, dipentene oxide, 1,4-butanediol diglycidyl ether, polyglycidyl ether of phenolformaldehyde resole or novolak resin, resorcinol diglycidyl ether, and epoxy silicones, e.g., poly(dimethylsiloxanes) having cycloaliphatic epoxide or glycidyl ether groups. An example of a heterocyclic epoxide group-containing compound is 1,3-bis(2,3-epoxypropyl-5,5-dimethyl-2,4-imidazolinedione). A wide variety of commercial epoxy resins is available and listed in "Handbook of Epoxy Resins" by Lee and Neville, McGraw-Hill Book Company, New York (1967) and in "Epoxy Resin Technology" by P. F. Bruins, John Wiley and Sons, New York (1968).

There is a host of commercially available cationically-sensitive epoxide group-containing compounds which can be used in this invention. In particular, cyclic ethers which are readily available include diglycidyl ether of bisphenol A (e.g., Epon TM 828, Shell Chemical Co., and DER TM 331, Dow Chemical Co.), vinylcyclohexene dioxide (e.g., ERL TM -4206, Union Carbide Corp.), 3,4-epoxycyclohexylmethyl 3,4-epoxycyclohexanecarboxylate (e.g., ERL TM -4221), 3,4-epoxy-6-methylcyclohexylmethyl 3,4-epoxy-6-methylcyclohexanecarboxylate (e.g., ERL TM -4201), bis(3,4-epoxy-6-methylcyclohexylmethyl)adipate (e.g., ERL TM -4289), aliphatic epoxy modified with polypropylene glycol (e.g., ERL TM -4050 and ERL TM -4052), dipentene dioxide (e.g., ERL TM -4269), (e.g. Oxiron TM 2001, FMC Corp.), silicone epoxy (e.g., Syl-Kem TM 90, Dow Chemical Co.), 1,4-butanediol diglycidyl ether (e.g., Araldite TM RD-2, Ciba-Geigy), polyglycidyl ether of phenolformaldehyde novolak (e.g., DEN TM -431, Dow Chemical Co., Epi-Rez TM 521 and DEN TM -438), resorcinol diglycidyl ether (e.g., Kopoxite TM, Koppers Co.), polyglycol diepoxide (e.g., DER TM 736), polyacrylate epoxide (e.g., Epocryl TM U-14, Shell Chemical Co.), urethane modified epoxide (e.g., QX3599 TM, Dow Chemical Co.), polyfunctional flexible epoxides (e.g., "Flexibilizer 151"), and mixtures thereof, as well as mixtures thereof with co-curatives, curing agents or hardeners which also are well known (see Lee and Neville and Bruins, supra). Representative of the co-curatives or hardeners which can be used are acid anhydrides such as nadic methyl anhydride, cyclopentanetetracarboxylic dianhydride, pyromellitic anhydride, cis-1,2-cyclohexanedicarboxylic anhydride, and mixtures thereof.

Monomer compositions (X) of the present invention that are polymerizable or crosslinkable to elastomers which preferably have a Tg below 25° C., include both liquid and solid monomer compounds that are soluble in the epoxide compound (Z) and also liquid compounds that are not soluble in the epoxide compound since these liquid compounds can readily be dispersed as very fine droplets by rapid stirring. Suitable compounds for use in the composition are compounds or mixtures of compounds having a reaction functionality that, when dissolved in an epoxide group-containing compound, can be polymerized to an elastomeric polymer under conditions that do not cause appreciable polymerization or reaction of the epoxide group. Preferably, the monomer composition comprises one or more ethylenically-unsaturated group-containing monomers or one or more diisocyanates and coreactive difunctional hydrogen compounds such as diols, diamines, and alkanolamines that are curable to elastomeric polymers.

Although any of the ethylenically-unsaturated monomers that are polymerizable by free radicals may be used in the monomer composition, to obtain a suitably elastomeric polymer, the monomers or mixtures of monomers used are selected such that on polymerization a polymer or copolymer is obtained that has a $T_g$ below about 25° C. Preferably the ethylenically-unsaturated monomers have the general formula:

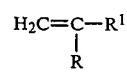

in which

R is hydrogen, methyl, or chlorine,

R$^1$ is halogen (flourine, chlorine, bromine),

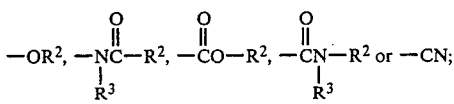

wherein:

R$^2$ and R$^3$ are independently hydrogen, a straight- or branched-chain alkyl group having 1 to 18 carbon atoms, a 5- or 6-atom carbocyclic group having 5 to 18 carbon atoms, a straight- or branched-chain alkoxyalkyl group having 2 to 18 carbon atoms, or R$^3$ together with R$^2$ and the —N— or

to which they are attached forms a 5- or 6-atom ring that can be further substituted by 1 to 4 lower alkyl groups (C$_1$ to C$_4$) or 1 benzo group.

For polymers of these monomers to have a T$_g$ below about 25° C., at least 50 percent of the monomers used generally are monomers in which R$^2$ has 4 carbon atoms or more and the average number of carbon atoms in the R$^2$ group is from 4 to 18. Preferably, the elastomeric polymers are polymers of one or more esters of acrylic or methacrylic acid with alkanols having 1 to 18 carbon atoms and an average of 4 to 18 carbon atoms. There can also be present in the monomer composition from about 0.1 to 10 percent by weight of the total monomer composition of a crosslinking monomer. The crosslinking monomer can be any material having at least two polymerizable ethylenic groups. Preferably, the crosslinking monomer is a divinyl cyclic hyrocarbon, e.g., 1,4-divinylbenzene, divinylcyclohexane or a polyester of a polyhydric alcohol and acrylic or methacrylic acid, e.g., 3-oxapentamethylene diacrylate or dimethacrylate, pentamethylene diacrylate or dimethyacrylate, ethylene diacrylate or dimethacrylate, trimethylol propane triacrylate or trimethacrylate, pentaerthritol tetracrylate or tetramethacrylate.

Suitable diisocyanates and coreactive difunctional compounds for use in the monomer composition include any of the diisocyanates and coreaction diols, diamines, and alkanolamines that react to give polyurethanes, polyureas, or polyurethaneureas that have a T$_g$ below about 25° C. The compounds and process for preparing elastomeric polyurethanes are well known (see, for example, Kirk-Othmer, "Encyclopedia of Chemical Techology", Vol. 21, Interscience Publishers, NY, page 94 et seq., 1970). Examples of preferred diisocyanates are the aromatic diisocyanates such as 2,4-tolylene diisocyanate, 4,4'-methylenebis(phenylene diisocyanate) and 1,5-naphthalene diisocyanate. Other diisocyanates include the preferred aliphatic and alicyclic diisocyanates such as hexamethylene diisocyanate and isophorone diisocyanate.

Examples of diols that can be reacted with the diisocyanates are the polymeric diols and diol extenders that are conventionally employed in the art for the preparation of urethane elastomers. The polymeric diols are polyester diols, poly(oxyalkylene) diols in which the alkylene group has 2 to 4 carbon atoms, polyolefin diols, and polydiene diols having a molecular weight from about 400 to 4000. Such diols are well-known in the art. Examples of the polyester diols (prepared from dicarboxylic acids having 4 to 18 carbon atoms and polyhydric alcohols having 2 to 18 carbon atoms) are poly(ethylene suberate)diol, poly(hexamethylene adipate)diol, and poly(caprolactone)diol. Examples of polyether diols are poly(oxypropylene)diol and poly(oxybutylene)diol. Other examples of polyester and polyether diols and how they are prepared are disclosed, for example, in U.S. Pat. No. 4,169,196, which is incorporated herein by reference.

Preferably, the insoluble colloidally-dispersed elastomeric particles are selected from particulate polymers of ethylenically-unsaturated monomers and polyurethanes (monomer compositions characterized by —NH-COO— groups) that are insoluble in the curable epoxide compound and have a glass transition temperature of 25° C. or less. Most preferably, the colloidally-dispersed elastomeric particle comprises a copolymer of ethylenically-unsaturated monomers of which 75 to 98 percent by weight are selected from one or more ethylenically-unsaturated monomers whose polymer or copolymer is insoluble in the epoxide group-containing compound and 25 to 2 percent by weight is a stabilizer which is a copolymerizable ethylenically-unsaturated group-substitued polymer that has a molecular weight of at least 1000 and is soluble in the epoxide group-containing compound.

Chain extenders (i.e., comonomers) which can be employed in the polyurethane monomer composition can be any of the diol chain extenders commonly employed in the art such as ethylene glycol and butanediol. Other suitable examples are disclosed, for example, in U.S. Pat. No. 4,169,196.

The stabilizer compound required in the composition of the invention is a compound having two functionalities, a first functionality (Q) giving it solubility in the epoxide group-containing compound and a second functionality (P) enabling the stabilizer to become attached to the elastomeric particle. The stabilizer with these functionalities can thus provide steric or entropic stabilization to the elastomeric particle against sedimentation or agglutination.

Suitable stabilizers, having the formula PQ, which is defined above, are compounds that can be classified into two different classes, Class I (subclasses a, b, c, and d) and Class II, both classes having in common a polymeric segment, Q, that preferably has a molecular weight of at least 1000 and is soluble in the epoxide group-containing compound, and a group P.

Preferred examples of polymers which provide Q segments are copolymers of one or more methyl and ethyl acrylate and methacrylate with about 1 to 5 percent by weight of a copolymerizable monomer having a reactive hydrogen-containing group (e.g., a hydroxyl, carboxyl, thiol, or amino group) or an isocyanate group; polymers of glycidyl ethers of mono- and polynuclear dihydric phenols, particularly the polymers of the glycidyl ether of bisphenol A having the formula

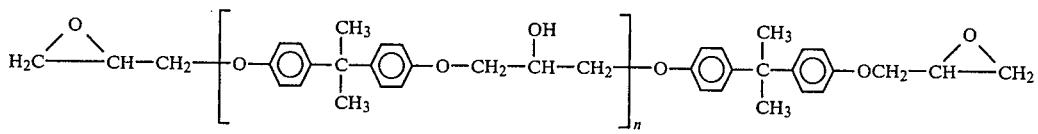

wherein n is a number having a value from 2 to 100; and polymers having an abstractable hydrogen atom, e.g., polyoxalanylene which has units with the structure

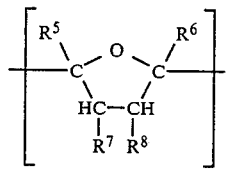

wherein $R^5$, $R^6$, $R^7$ and $R^8$ are individually hydrogen or alkyl groups containing up to 8 carbon atoms each, provided that at least one of $R^5$ and $R^6$ is hydrogen.

In the Class I Stabilizer, P is a group copolymerizable with the elastomer monomer composition, reactive with the growing polymer of the monomer composition, able to initiate the polymerization of the monomer composition, or a group forming an ionic bond with one of the monomers in the monomer composition, e.g., a carboxyl or an amino group. In the Class II Stabilizers, P is a polymeric segment having a functionality that is soluble in the growing polymer of the monomer composition.

Class I Stabilizers can be any polymer having the necessary molecular weight and solubility characteristics and P is selected from subclass (a) one or more reactive hydrogen-containing groups or isocyanate groups making them copolymerizable, respectively, with the diisocyanate or coreactive difunctional monomer composition. Examples of such stabilizers are the reactive hydrogen group-containing copolymers comprising methyl and ethyl acrylate with 0.1 to 10 mole percent of an hydroxyl-, carboxyl-, thio-, amido- or amino-substituted alkyl acrylate or methacrylate, such as poly(98 percent methyl acrylate-co-2 percent 2-hydroxyethyl acrylate). In this copolymer, the segments derived from methyl acrylate provide a molecular weight above 1000 and solubility in the epoxide group-containing compound;

subclass (b) one or more ethylenically-unsaturated groups making them copolymerizable with the ethylenically-unsaturated monomer composition. Examples of such stabilizers are the reaction products of the reactive hydrogen group-containing polymers described in (a) above with acryloylating compounds such as acryloyl or methacryloyl chloride, acrylic or methacrylic anhydride, ω-isocyanatoalkyl acrylate or methacrylate and 2,3-epoxypropyl acrylate or methacrylate. An example of such a stabilizer is poly(98 percent methyl acrylate-co-2 percent acryloyloxyethylcarbamoyloxyethyl methacrylate);

subclass (c) a group having an easily abstractable or transferable proton that leaves a polymeric free radical such as, for example, poly(2,5-oxolanylene) which is disclosed in U.S. Pat. No. 4,309,516 and incorporated herein by reference, poly(<50 percent butadiene-co->50 percent styrene), and poly(oxytetramethylene); and subclass (d) an acid or basic group such as a carboxyl or an amino group. An example of such a stabilizer is a copolymer of methyl acrylate and 1 to 5 weight percent of acrylic acid.

When the elastomer is a polyurethane polymer, P of Stabilizer PQ can be either an isocyanate group or a reactive hydrogen-containing group so as to copolymerize with the polyurethane-forming monomers and thus attach Q to the polyurethane. When the elastomer is a copolymer of ethylenically-unsaturated monomers, P of Stabilizer PQ can be an ethylenically-unsaturated group so as to copolymerize therewith. When the elastomer is a copolymer of ethylenically-unsaturated monomers, P of Stabilizer PQ can be an easily extracted proton which, in the presence of peroxide, leaves a polymeric free radical on which the monomers become grafted. Also, when the elastomer is a copolymer of ethylenically-unsaturated monomers, P of Stabilizer PQ can be a free radical initiator covalently attached to Q which can initiate the polymerization of the monomers and form a graft polymer. When the elastomer is a copolymer of ethylenically-unsaturated monomers, one of which has an acid or basic group (i.e., carboxyl or amino group), P of Stabilizer PQ can be a basic or acid group complementary to the acid or basic groups so as to ionically bond the stabilizer to the elastomer.

Class II stabilizers are segmented polymers having both a polymeric segment Q, that is, as defined above for Class I Stabilizers and a polymeric segment P that has a molecular weight of at least 1000 and is soluble in the growing polymer of the monomer composition. Examples of such segmented polymers are those resulting from the polymerization of 1 part of an acryloylated active hydrogen group-containing methyl or ethyl polymer (as described under Class Ib Stabilizers) and 0.5 to 1.5 parts of alkyl acrylates in which the alkyl group has 4 carbon atoms or more and an average of 4 to 8 carbon atoms.

Where the elastomeric particle is a polymer of an ethylenically-unsaturated monomer, the curable composition of the invention is prepared by mixing in a suitable reaction vessel the epoxide compound, one or more ethylenically-unsaturated monomers, the stabilizer, and 0.05 to 5.0 percent by weight of a free radical polymerization initiator, based on total weight of ethylenically-unsaturated compounds. The vessel is flushed with inert gas, e.g., nitrogen, and the contents are agitated vigorously. The reaction is then allowed to proceed while applying cooling or heat to maintain a controlled temperature from about 25° to 125° C. for 2 to 24 hours. Preferably, the temperature is maintained at 50° to 80° C. for 10 to 20 hours. Suitable sources of free radicals are the organic peroxides such as lauroyl peroxide or azobis(isobutyronitrile). Other sources of free radicals, well known in the art for polymerization of ethylenically-unsaturated compounds, can be used. Following the reaction, the composition is cooled to 25° C.

and is ready for compounding, if desired, immediate use, or storage.

Where the elastomeric particle is a polyurethane, the composition of the invention is prepared by mixing in a suitable reaction vessel the epoxide, the stabilizer, the polyols and 0.95 to 1.05 equivalents of one or more diisocyanates, and optionally a catalyst for urethane formation, such as stannous octoate or other catalyst as is known in the art. Vigorous agitation is employed. Generally, as the reactants are added to the epoxide compound, they dissolve, the temperature of the mixture rises, and particulate reaction product begins to form as is made evident by the mixture taking on a milky appearance. The temperature is allowed to climb and with added heat held at 75° to 125° C. until analysis indicates disappearance of the isocyanate group. The reaction is complete in less than 60 minutes.

The epoxy composition of the invention may be compounded, as is customary with epoxy compositions, by the addition of pigments such as carbon black, clay, silica, glass beads, glass fibers, coloring agents, antioxidants, plasticizers, flame retardants such as antimony trioxide, fillers, extenders, and the like. From about 0.5 to 100 parts of additive per 100 parts of epoxy composition may be added.

The epoxy composition can be cured by a variety of curing agents as are described, together with the method for calculating the amount to be used, in the book by Lee and Neville, "Epoxy Resins," pages 36 to 140, McGraw-Hill Book Compny, New York, 1957. Useful curing agents include amines such as ethylenediamine, diethylenetriamine, aminoethylethanolamine, and the like, diaminodiphenylsulfone, dicyandiamide, organic acids such as adipic acid, and acid anhydrides such as phthalic anhydride, chlorendic anhydride and the like. Generally, the mixture of epoxy composition and curing agent in stoichiometric amounts (i.e., one active amine hydrogen for each epoxide group) can be cured by heating at 20° to 200° C. for 10 minutes to about 10 hours, preferably 100° to 200° C. for 0.5 to 1.0 hour depending on the particular epoxide compound, curing agent, and the amount of material being cured.

The epoxy compositions can also be cured by catalytic agents that are either thermally-activated or photoactivated.

Examples of the thermally activated catalytic agents include $BF_3$-amine complexes, benzyldimethylamine, trimethylamine. Examples of photoactivated catalysts include 4-chlorobenzenediazonium hexafluorophosphate, diphenyliodonium hexafluoroarsenate, and triphenyl hexafluoroarsenate. Other photoactivated catalysts are well known and are taught in U.S. Pat. Nos. 4,039,521, 4,069,955, and 4,076,536. When a thermally-activated catalyst is employed, from about 0.01 to 20 percent by weight, preferably 0.5 to 5 percent by weight, of catalyst based on the epoxy composition is used. Within these catalyst concentrations, curing can be made to proceed using lower temperatures (e.g., down to −10° C.) or elevated temperatures (e.g., 30° to 200° C., preferably 50° to 100° C.) to either subdue the exotherm of polymerization or to accelerate the polymerization. When a photoactivated catalyst is used, 0.01 to about 10 percent by weight of catalyst, based on the epoxy composition, is used. Curing is effected by exposing the catalyzed composition to any source of radiation-emitting actinic radiation at a wavelength within the visible and ultraviolet spectral regions. Suitable sources of radiation include mercury vapor, xenon, carbon arc, sunlight, etc. Exposures may be from less than about 1 second to 10 minutes or longer depending on the particular epoxide compound, the photoactivatory, the specific source, the distance from the source, and the thickness of the composition to be cured.

The epoxy compositions of the invention can be used for any of the applications for which epoxy resins are normally used. This includes coatings, adhesives, caulking, sealing, molding, potting, and encapsulating compositions. The compositions of the invention can also be used as impregnating compositions for fibers of glass, graphite, boron, ceramic, and Kevlar TM etc., all providing fiber-reinforced composites, depending on the particular epoxide compound and additives employed. The present compositions are particularly well adapted for one-part, cured-in-place, applications.

In the following examples, crack propagation (method of measuring toughness, e.g., double torsional fracture test wherein a sharp crack is introduced into a sample of cured resin and is allowed to propagate until the sample fails as energy is applied when opposite ends of the sample are twisted apart) of cured epoxy composition is measured using an Instron Tensile Tester by the procedure described by D. J. Gerry, Ph.D. Thesis, University of Vermont (1965).

Resistance to heat shock fracture of the cured epoxy composition is assessed by the procedure described by M. Olyphant, "Thermal Shock Test For Casting Resins," Conf. on the Appl. of Elec. Insul. (IEEE/NEMA), Cleveland, 1958. In accordance with this test a 3.17 mm thick steel washer is placed in a 45 mm diameter aluminum dish and 30 g of epoxy composition is poured therein. The dish and its contents are vacuum degased and the composition cured in an oven at 90° C. for one hour and 120° C. for 16 hours. The cured composition with embedded steel washer is then removed from the aluminum dish, heated to 130° C. for 15 min. in a forced air oven and plunged into dry ice-acetone for above five minutes, removed, and allowed to warm to 20° C. and inspected for crack formation. The process of heating and cooling followed by inspection for cracks is repeated for 15 times or until crack formation is noted by visual inspection.

The following examples serve to further describe the invention. Parts are by weight unless otherwise indicated.

Class Ia Stabilizer

Into a dry reaction flask were placed 31.5 g of 2,2-bis[4-(2,3-epoxypropoxy)phenyl]propane (available as DER TM -332 from Dow Chemical Co.) that had been thoroughly dried by agitating at 50° C. with 1.63 grams phenyl isocyanate followed by vacuum distillation to remove unreacted phenyl isocyanate. To the hydroxyl-free epoxide group-containing compound was added 3.3 g of methyl acrylate, 0.2 g of 2-isocyanatoethyl methacrylate, and 0.035 g of azobisisobutyronitrile. The solution was flushed with nitrogen, agitated, and heated to 60° C. These conditions were maintained for 16 hours after which the viscous 10 percent by weight solution of poly(methylacrylate-co-2-isocyanatoethyl methacrylate) in epoxy compound was cooled to 25° C. This modified polymer, poly(methyl acrylate-co-2-isocyanatoethyl methacrylate), a subclass Ia Stabilizer was identified as "Stabilizer D".

Class Ib Stabilizers

Into a dry reaction flask there were placed 95 g of EPON ™ 1009 (a bisepoxy reaction product of bisphenol A and epichlorohydrin having a molecular weight of 8080), 200 g tetrahydrofuran, and 5 g of 2-isocyanatoethyl methacrylate. The mixture was agitated and heated at 80° C. for five hours. The resulting solution contained 33.3 percent by weight of modified polymer having an average of 2.7 pendent methacrylic groups per polymer chain, a subclass Ib Stabilizer, identified as "Stabilizer A".

Into a dry reaction flask were placed 79 g methyl acrylate, 10 g acrylic acid, 300 g tetrahydrofuran and 0.4 g azobis(isobutyronitrile). The mixture was flushed with dry nitrogen, agitated, and heated to 60° C. These conditions were maintained for 16 hours after which the viscous solution of copolymer obtained was cooled to 35° C. and 11 g 2-isocyanato-ethylmethacrylate was added. This mixture was agitated at 35° C. for 24 hours. At the end of this time, the isocyanate absorption bond as indicated by infrared spectroscopy had disappeared. The product obtained was a 25 percent solution of a polymer of ethylenically-unsaturated monomers, soluble in the epoxide compound and having pendent 2-methyacryloyloxyethylcarbamoyl groups. This modified polymer, poly[methyl acrylate-co-N-(2-methacryloylethyl)acrylamide], a subclass Ib Stabilizer, was identified as "Stabilizer B".

Class II Stabilizers

Into a dry reaction flask were placed 30 g of the 33.3 percent by weight solution in tetrahydrofuran of Stabilizer A, 10 g hexyl acrylate, 60 g tetrahydrofuran and 0.2 g azobis(isobutyronitrile). The mixture was flushed with dry nitrogen, agitated, and heated to 65° C. These conditions were maintained for 16 hours after which the viscous solution was cooled. There was obtained a 20 percent solution of a segmented polymer having a segment (from Epon ™ 1009) that is soluble in epoxide-compounds and segments (from hexylacrylate) that are insoluble in epoxy compounds. This modified polymer, a polymer of "Stabilizer A" and hexyl acrylate, a Class II Stabilizer was identified as "Stabilizer C".

Objects and advantages of this invention are further illustrated by the following examples, but the particular materials and amounts thereof recited in these examples, as well as other conditions and details, should not be construed to unduly limit this invention.

EXAMPLE 1

Into a 500 ml reaction vessel equipped for distillation were placed 78 g DER ™-332 (diglycidyl ether of bisphenol A having an epoxy equivalent weight of 185 to 191 available from Dow Chemical Co.) and 6.0 g Stabilizer A solution (2.0 g solids). The vessel was evacuated and heated to distill tetrahydrofuran until the pot temperature reached 100° C. at a pressure of less than 1.0 torr. The temperature was reduced to 25° C., the vacuum removed and 20 g hexyl acrylate and 0.1 g azobis(isobutyronitrile) were added. The distilling apparatus was replaced by an agitator. The vessel was flushed with nitrogen the vessel contents vigorously agitated and heated to 65° C. These conditions were maintained for 16 hours, after which a moderately viscous milky dispersion was obtained.

The procedure of this EXAMPLE was repeated using, however, four other formulations. The components of the five samples are shown in TABLE I.

TABLE I

| Materials (in grams) | Sample 1 | 2 | 3 | 4 | 5 |
|---|---|---|---|---|---|
| ERL-4221 | — | — | — | — | 67 |
| Der-332 | 78 | 78 | 78 | 78 | — |
| Stabilizer A solution [solids] | 6.0[2.0] | — | — | 6.0[2.0] | — |
| Stabilizer B solution [solids] | — | 8.0[2.0] | — | — | 12.0[3.0] |
| Stabilizer C solution [solids] | — | — | 20[4.0] | — | — |
| hexylacrylate | 20 | 20 | 18 | — | 30 |
| 60 butylacrylate/40 isooctylacrylate | — | — | — | 20 | — |
| azobis-(isobutyronitrile) | 0.1 | 0.1 | 0.1 | 0.1 | 0.15 |

In each of samples 2–5, a moderately viscous milky dispersion of acrylic elastomeric particles in curable epoxide compound was obtained.

EXAMPLE 2

Into a 500 ml reaction vessel were placed 70 g of DER ™-332, dried as described for the preparation of Stabilizer D, 15 g of the 10 percent solution of Stabilizer D in DER ™-332, 15 g of poly(butadiene)diol having an hydroxyl equivalent weight of 1253 (available as poly(butadiene)diol from Aldrich Chemical Company), and 0.05 g stannous octoate. The vessel and its contents were flushed with nitrogen and heated to 80° C. These conditions were maintained for 5 hours, after which time 1.15 g toluene diisocyanate was added and the conditions maintained for an additional 16 hours. There was obtained a milky dispersion of elastomeric polyurethane particles in DER ™-332.

EXAMPLE 3

The rubbery dispersions prepared in DER ™-332 (samples 1, 2, 4, from EXAMPLE 1 and sample 6 of EXAMPLE 2) were cured and compared to an unmodified control. Samples 1, 2, 4, and 6 and the control had the compositions as shown in TABLE II.

TABLE II

|  | Samples 1, 2, 4, 6 | Control |
|---|---|---|
| Epoxy dispersion | 125 parts | — |
| Resorcinol | 20 parts | 20 parts |
| 2-ethyl-4-methylimidazole | 3.3 parts | 3.3 parts |
| DER ™-332 | — | 100 parts |

The resin samples and control were cured in Teflon ™ molds giving specimens appropriate for the various tests. The resins were cured by heating to 60° C., 90° C., and 120° C. for 1 hour, 1 hour, and 16 hours, respectively.

The results of the physical properties are tabulated below in TABLE III.

TABLE III

| Sample | Glass transition temperature | Double torsinal fracture energy (ergs/cm$^2$) | Thermal heat shock |
|---|---|---|---|
| 1 | 112° C. | $1.15 \times 10^7$ | Greater than 15 cycles |
| 2 | 113° C. | $1.09 \times 10^7$ | Greater than 15 cycles |
| 4 | 112° C. | $1.10 \times 10^7$ | Greater than 15 cycles |

TABLE III-continued

| Sample | Glass transition temperature | Double torsinal fracture energy (ergs/cm$^2$) | Thermal heat shock |
|---|---|---|---|
| 6 | 116° C. | 0.95 × 10$^7$ | Greater than 15 cycles |
| Control | 115° C. | 0.01 × 10$^7$ | 1 cycle |

The data of TABLE III shows that the toughness and resistance to heat shock fracture of the resin samples within the scope of the invention far surpassed that of the control which contained no rubbery dispersion.

EXAMPLE 4

This EXAMPLE demonstrates the use of the composition of the invention for the preparation of glass fiber composites. Unidirectional composites (article and control) were prepared using as a matrix resin, for the article, an epoxy resin containing a dispersed elastomer in accordance with the present invention and, for comparison, epoxy resin without the dispersed elastomer. The dispersion of EXAMPLE 1, Sample 1 (77.7 parts by weight) was mixed with EPON TM 1001 (32.6 parts) as epoxy additive, and with parachloro phenyl-1-dimethyl urea (0.8 parts), and dicyandiamide (6.0 parts) as curing agents. The control matrix resin contained the epoxide group-containing compound, the epoxy additive, and curing agents (identical parts by weight) but no dispersion.

The above mixtures were coated onto unidirectional glass fibers so that the final composition was 70 percent glass and 30 percent epoxy/curative. The composites were cured by heating to 121° C. (250° F.). The fracture energy of the two samples was compared by the double torsional fracture energy test fracture. The data is shown in TABLE IV below.

TABLE IV

| Sample | Fracture energy (ergs/cm$^2$) |
|---|---|
| Article (with dispersed elastomer) | 4.12 × 10$^7$ |
| Control (without dispersed elastomer) | 0.2 × 10$^7$ |

The data of TABLE IV show that the energy required to fracture the article coated with a cured composition of the invention was more than 20 times that for the control.

EXAMPLE 5

This EXAMPLE demonstrated the attachment of the epoxy containing soluble segment Q to the elastomer particle by formation of a free radical on the Q segment of the stabilizer, a subclass Ic Stabilizer. The following ingredients were mixed together in a reaction vessel with stirring:
 hexyl acrylate—20.0 g
 poly(2,5-oxolanylene)*—2.0 g
 DER TM -332—78.0 g
 tert-butyl hydroperoxide—0.2 g
*U.S. Pat. No. 4,309,516

The reaction vessel, under a nitrogen atmosphere, was heated to 75° C. for 48 hours. This procedure resulted in a fluid milky dispersion of hexyl acrylate particles with poly(2,5-oxolanylene) appended onto the surface of the colloidal particle. The poly(2,5-oxolanylene) became attached because, in the presence of a hydroperoxide, a hydrogen radical was abstracted from the polymer backbone leaving a polymeric free radical. (The polymeric radical can attach to a polyhexyl acrylate chain either by initiating a growing polyhexyl acrylate chain or coupling with a growing polyhexyl acrylate radical).

EXAMPLE 6

This EXAMPLE demonstrated attachment of the epoxide-containing soluble segment Q to the elastomer particle by having the free radical initiator attached to segment Q. Segment Q was prepared from the following components:
 methylacrylate: 30.0 g
 isocyanatoethyl methacrylate: 3.0 g
 DER TM -332 (dried following the procedure for Stabilizer D): 67.0 g
 azobis(isobutyronitrile): 0.3 g The ingredients were mixed together in a reaction vessel under a N$_2$ atmosphere and heated to 65° C. for 24 hours. A clear viscous solution resulted and was designated solution M. The dispersion was prepared from the following components:
 solution M: 6.0 g
 hexyl acrylate: 20.0 g
 DER TM -332: 74.0 g
 cumen hydroperoxide: 0.2 g The components were mixed together in a reaction vessel under a N$_2$ atmosphere and heated to 75° C. for 24 hours. This resulted in a milky dispersion and 75 percent conversion of the hexyl acrylate into elastomer particles. Azobis(isobutyronitrile) (0.1 g) was added and the dispersion was heated for an additional 8 hours. This resulted in the polymerization of the untreated hexyl acrylate. The radical initiator in this EXAMPLE was formed by the reaction of the cumen hydroperoxide with the isocyanate functional Q segment. The resulting peroxycarbamate cleaved, formed a free radical on the Q segment, initiated the hexyl acrylate polymerization, and thus attached the Q segment to the growing elastomer particle. The stabilizer of this EXAMPLE was a subclass Ic Stabilizer.

EXAMPLE 7

This EXAMPLE showed that a Q segment with no mechanism of attaching itself to the growing elastomer was ineffective in forming a colloidal dispersion. The following components were mixed together:

| hexyl acrylate | 20 g | 20 g | 20 g | 20 g |
|---|---|---|---|---|
| poly(methyl acrylate) | 2 g | 4 g | — | — |
| EPON TM 1009 | — | — | 2 g | 4 g |
| DER TM -332 | 78 g | 76 g | 78 g | 76 g |
| azobis(isobutyronitrile) | 0.2 g | 0.2 g | 0.2 g | 0.2 g |

The components were mixed together in a reaction vessel with stirring under a N$_2$ atmosphere, and heated to 65° C. for 24 hours. All samples resulted in a nonhomogeneous mixture of globules of unstabilized poly(hexyl acrylate) in DER TM -332.

EXAMPLE 8

This EXAMPLE demonstrates binding a stabilizer segment Q to the elastomer particle via an ionic bond. The Q segment containing a carboxylic acid group (P) was prepared from the following components:
 methyl acrylate (Q precursor): 7.76 g
 acrylic acid: 0.24 g ethyl acetate: 24.0 g
azobis(isobutyronitrile): 0.04 g The components were mixed together in a reaction vessel under a nitrogen atmosphere and allowed to react for 7 hours at 75° C. A clear viscous solution was produced. This stabilizer solution was used in preparing a colloidal dispersion of stabilizer attached elastomeric particles in an epoxide compound using the following components:

hexyl acrylate: 19.5 g
2-(dimethylamino)ethyl methacrylate: 0.5 g
stabilizer solution: 8.0 g (2.0 grams solids)
DER TM -332: 78.0 g
azobis(isobutyronitrile): 0.1 g These components were mixed in a reaction vessel under vacuum to remove the ethyl acetate from the stabilizer solution. The vessel was then placed under a nitrogen atmosphere and heated to 65° C. for 16 hours. This procedure resulted in a fluid, stable, milky dispersion of poly(hexyl acrylate-co-2-(dimethylamino)ethyl methacrylate elastomeric particles in DER TM -332. In this example the stabilizer (a subclass Id Stabilizer) was attached to the elastomer particle via an ionic bond formed between the carboxylic acid on segment Q and the tertiary amine group present in the elastomeric particle.

Various modifications and alterations of this invention will become apparent to those skilled in the art without departing from the scope and spirit of this invention, and it should be understood that this invention is not to be unduly limited to the illustrative embodiments set forth herein.

We claim:

1. A composition of matter that is storage stable against separation of phases comprising:
   a. 1.0 part of a curable epoxide group-containing compound having one or more oxirane groups, and
   b. 0.05 to 1.0 part of colloidally-dispersed, elastomeric particles that are insoluble in said epoxide compound, comprising,
   (1) 75 to 98 percent by weight of an elastomeric polymer having a glass transition temperature of 25° C. or less and is selected from polymers derived from at least one (1) ethylenically-unsaturated group-containing monomer and from (2) diisocyanates and coreactive difunctional hydrogen compounds, said at least one monomer being in situ polymerized in said curable epoxide group-containing compound to a polymer which is insoluble in said epoxide compound and
   (2) 25 to 2 percent by weight of a stabilizer having the formula PQ, in which
   Q is a polymeric segment that has a molecular weight of at least 1000 and is soluble in said epoxide group-containing compound, and
   P is selected from
      (a) a functional group covalently attached to Q and also attached to the elastomeric particle during particle growth by formation of a covalent or ionic bond with the elastomeric particle, and
      (b) a polymeric segment that has a molecular weight of at least 1000 and that becomes absorbed into the elastomeric particle because it is soluble in said elastomeric polymer of said monomer composition but insoluble in said epoxide group-containing compound.

2. The composition according to claim 1 wherein said curable epoxide group-containing compound is a glycidyl ether of a bisphenol.

3. The composition according to claim 1 wherein said ethylenically-unsaturated monomer has the formula

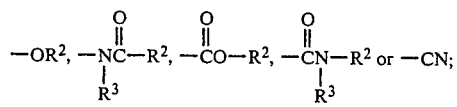

in which
R is hydrogen, methyl, or chlorine,
$R^1$ is halogen (fluorine, chlorine, bromine), $$-OR^2, -\underset{R^3}{NC}-R^2, -CO-R^2, -\underset{R^3}{CN}-R^2 \text{ or } -CN;$$

wherein:
$R^2$ and $R^3$ are independently hydrogen, a straight- or branched-chain alkyl group having 1 to 18 carbon atoms, a 5- or 6-atom carbocyclic group having 5 to 18 carbon atoms, a straight- or branched-chain alkoxyalkyl group having 2 to 18 carbon atoms, or $R^3$ together with $R^2$ and the —N— or

to which they are attached forms a 5- or 6-atom ring that can be further substituted by 1 to 4 lower alkyl groups ($C_1$ to $C_4$) or 1 benzo group.

4. The composition according to claim 1 wherein said elastomeric particle is derived from essentially stoichiometric amounts of diisocyanates and diols.

5. The composition according to claim 1 wherein said elastomeric particle is a polymer of at least one ethylenically-unsaturated group-containing monomer and said stabilizer is a compound comprising a segment that is soluble in said curable epoxide group-containing compound and has a functionality that is reactive with or soluble in said elastomeric particle.

6. The composition according to claim 1 wherein said ethylenically-unsaturated monomer is selected from esters of acrylic acid with alkanols having 4 to 18 carbon atoms and an average of 4 to 8 carbon atoms.

7. The composition according to claim 1 wherein said polymer is the reaction product of an aromatic diisocyanate and a polymeric diol having a molecular weight of 400 to 4000.

8. The composition according to claim 1 wherein Stabilizer PQ is a polymer selected from the class consisting of polymers having a functionality soluble in said elastomeric polymer, covalently bonded to said elastomeric polymer, or ionically bonded to said elastomeric polymer.

9. The composition according to claim 8 wherein said stabilizer is selected from polymers soluble in epoxide group-containing compounds.

10. A composition of matter according to claim 1, said composition being prepared by a process comprising the steps:
   a. providing 1.0 part of a curable epoxide group-containing compound;

b. dissolving or dispersing in said epoxide compound in either order from 0.05 to 1 part per part of epoxide compound of a composition comprising
  (1) 75 to 98 percent by weight of polymerizable monomer composition that is polymerizable to a polymer insoluble in said epoxide compound, and
  (2) 25 to 2 percent by weight of a stabilizer having the formula PQ, in which
    Q is a polymeric segment that has a molecular weight of at least 1000 and is soluble in said epoxide group-containing compound, and
    P is a selected from
      (a) a functional group covalently attached to Q and also attached to the elastomeric particle during particle formation by formation of a covalent of ionic bond with the elastomeric particle, and
      (b) a polymeric segment that has a molecular weight of at least 1000 and that becomes absorbed into the elastomeric particle because it is soluble in said elastomeric polymer of said monomer composition but insoluble in said epoxide group-containing compound; and
c. subjecting the solution of said monomer composition in said epoxide group-containing compound to conditions which polymerize said monomer composition and stabilizer without either polymerizing or reacting with said epoxy group-containing compound.

11. A process for preparing a solventless, fluid epoxide compound-containing composition, that is storage stable against phase separation, said process comprising the steps:
  a. providing 1.0 part of a curable epoxide group-containing compound having one or more oxirane groups;
  b. dissolving or dispersing in said epoxide compound in either order from 0.05 to 1 part per part of epoxide compound of a composition comprising
    (1) 75 to 98 percent by weight of polymerizable monomer composition that is polymerizable to a polymer insoluble in said epoxide compound, said polymer having a glass transition temperature of 25° C. or less and is selected from polymers derived from at least one (1) ethylenically-unsaturated group-containing monomer and from (2) diisocyanates and coreactive difunctional hydrogen compounds, and
    (2) 25 to 2 percent by weight of a stabilizer having the formula PQ, in which
      Q is a polymeric segment that has a molecular weight of at least 1000 and is soluble in said epoxide group-containing compound, and
      P is selected from
        (a) a functional group covalently attached to Q and also attached to the elastomeric particle during particle formation either by formation of a covalent or ionic bond with the elastomeric particle, and
        (b) a polymeric segment that has a molecular weight of at least 1000 and that becomes absorbed into the elastomeric particle because it is soluble in said elastomeric polymer of said monomer composition but insoluble in said epoxide group-containing compound, and
  c. subjecting the solution of said monomer composition in said epoxide group-containing compound to conditions which polymerize said monomer composition and stabilizer without either polymerizing or reacting with said epoxy group-containing compound.

12. The process according to claim 11 wherein said monomer composition is polymerized by free radicals.

13. The cured composition according to claim 1.

14. A composite article comprising the composition according to claim 1 reinforced with fibrous material.

15. A process for providing a cured composition of matter comprising the steps:
  a. providing 1.0 part of a curable epoxide group-containing compound having one or more oxirane groups;
  b. dissolving or dispersing in said epoxide compound in either order from 0.05 to 1 part per part of epoxide compound of a composition comprising
    (1) 75 to 98 percent by weight of polymerizable monomer composition that is polymerizable to a polymer insoluble in said epoxide compound, said polymer having a glass transition temperature of 25° C. or less and is selected from polymers derived from at least one (1) ethylenically-unsaturated group-containing monomer and from (2) diisocyanates and coreactive difunctional hydrogen compounds, and
    (2) 25 to 2 percent by weight of a stabilizer having the formula PQ, in which
      Q is a polymeric segment that has a molecular weight of at least 1000 and is soluble in said epoxide group-containing compound, and
      P is selected from
        (a) a functional group covalently attached to Q and also attached to the elastomeric particle during particle formation by formation of a covalent or ionic bond with the elastomeric particle, and
        (b) a polymeric segment that has a molecular weight of at least 1000 and that becomes absorbed into the elastomeric particle because it is soluble in said elastomeric polymer of said monomer composition but insoluble in said epoxide group-containing compound, and
  c. subjecting the solution of said monomer composition in said epoxide group-containing compound to conditions which polymerize said monomer composition and stabilizer without either polymerizing or reacting with said epoxy group-containing compound; and
  d. subjecting said polymerized composition to a chemically effective amount of at least one curing agent and a chemically effective amount of a catalyst to provide said cured composition.

* * * * *